UNITED STATES PATENT OFFICE.

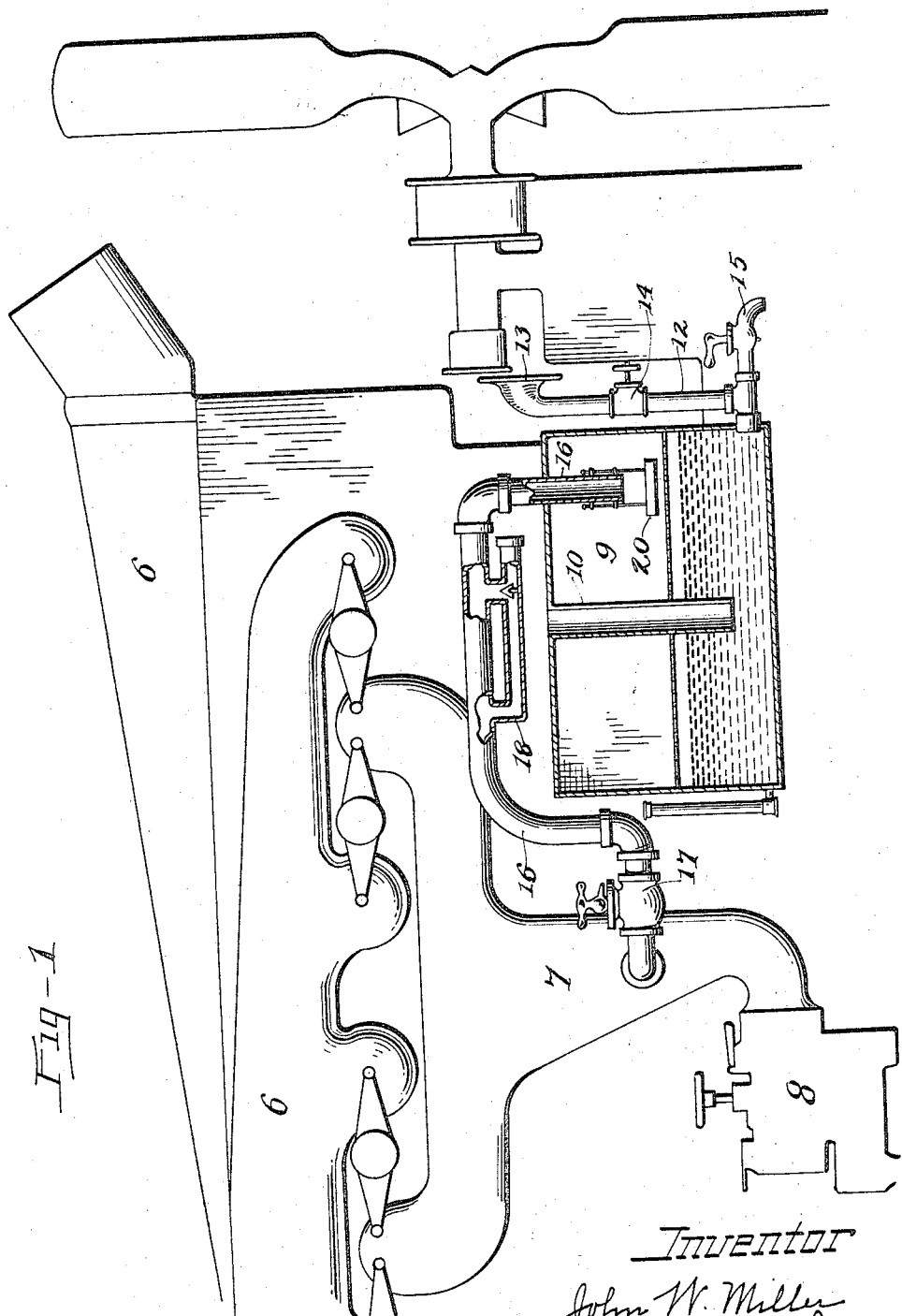

JOHN W. MILLER, OF CLEVELAND, OHIO.

CHARGE-FORMING DEVICE FOR INTERNAL-COMBUSTION ENGINES.

1,237,539.      Specification of Letters Patent.      Patented Aug. 21, 1917.

Application filed October 16, 1915. Serial No. 56,258.

*To all whom it may concern:*

Be it known that I, JOHN W. MILLER, citizen of the United States, residing at Cleveland, in the county of Cuyahoga and State of Ohio, have invented certain new and useful Improvements in Charge-Forming Devices for Internal-Combustion Engines, of which the following is a specification.

This invention relates to charge forming devices for internal combustion engines, and comprises means for moistening and heating the air supply to such engines, the object being to increase the power of the engine.

A further object of the invention is to provide improved means for introducing a vapor into the engine which will prevent or remove carbon deposits.

The device includes means controlling the temperature at which the moistened air is delivered to the mixture, the vapor being produced by air admitted through hot and cold air pipes, and superheated in the pipe leading to the intake pipe to the engine.

The invention is illustrated in the accompanying drawing which is a side elevation, partly in section, of the apparatus.

Referring specifically to the drawing, 6 indicates an engine and 7 the intake pipe thereto from the carbureter 8. A tank 9, for water, is placed closely beside the engine, so as to be within the influence of the heat thereof. This tank is partly filled with water, to which may be added a decarbonizing compound if desired. Extending downwardly from the top of the tank is a hot air inlet pipe 10, the lower end of which dips below the surface of the liquid. The hot air is drawn into the tank from a position adjacent the side wall and exhaust pipe of the engine. To equalize or regulate the temperature, and prevent excessive heating, the front end of the tank is provided with a cold air inlet pipe 12 which has a bell mouth 13 just behind the fan, and cold air is forced by the fan through the pipe and up through the liquid in the tank. The pipe 12 has a regulating valve 14. 15 is a drain cock to draw off the liquid from the tank.

The air bubbling through the water in the tank is moistened or forms a vapor in the upper part of the tank, from which it is drawn by means of pipe 16 which dips into the tank and is connected to the intake pipe 7. A valve 17 controls the amount of flow through the pipe.

To vaporize any condensation or liquid in the vapor supplied to the engine, I provide a heater consisting of a pipe section 18 connected at its opposite ends to the pipe 16, and located under the same and any liquid in the pipe passes into this heater and is vaporized and drawn thence into and through the pipe.

To prevent the liquid entering the pipe 16, incident to splashing of the water, the mouth of said pipe is provided with a float or check valve 20, which, if the water strikes the same, will lift and close the mouth of the pipe 16.

In operation, the suction of the engine draws in air through the hot air pipe 10, as well as through the cold air pipe 12, the action of the latter being assisted by the fan, and the air bubbles up through the water or other compound, forming a moist vapor which is drawn in through the pipe 16 where it is heated and passes to the intake pipe 7 of the engine, where it mixes with the gas, and forms a mixture which increases the efficiency of the engine, and which may also serve to prevent carbon deposits. The temperature and amount of the vapor added to the mixture may be controlled by the regulating valves indicated.

What I claim is:

1. The combination of an internal combustion engine and a fan driven thereby, of a water tank located beside the engine and adapted to be heated thereby, an air pipe opening into said tank below the water level therein and having its mouth arranged to receive air from the fan, and a vapor pipe connecting the tank and the intake pipe of the engine.

2. The combination of the intake pipe of an internal combustion engine, a tank for liquid, a hot air pipe leading to said tank, a valved cold air inlet pipe leading to said tank, said pipes opening into said tank below the surface of the liquid therein, a connecting pipe from the vapor space of the tank to said intake pipe, and a float valve in the tank, controlling the mouth of said connecting pipe, to prevent entry of liquid thereinto.

In testimony whereof, I do affix my signature in presence of two witnesses.

JOHN W. MILLER.

Witnesses:
   J. B. DAVIS,
   JOHN A. BOMMHARDT.